United States Patent [19]

Fujimura

[11] Patent Number: 4,887,010
[45] Date of Patent: Dec. 12, 1989

[54] DISPLAY DEVICE USING SHADOWMASK CRT

[75] Inventor: Takeo Fujimura, Nagaokakyo, Japan

[73] Assignee: Mitsubishi Denki Kabushiki Kaisha, Tokyo, Japan

[21] Appl. No.: 314,941

[22] Filed: Feb. 24, 1989

[30] Foreign Application Priority Data

Feb. 26, 1988 [JP] Japan .................... 63-045132

[51] Int. Cl.⁴ .............................. H01J 29/56
[52] U.S. Cl. .................................. 315/370
[58] Field of Search ................ 315/370; 358/80

[56] References Cited

U.S. PATENT DOCUMENTS 4,037,133 7/1977 Sennik ................. 315/382

FOREIGN PATENT DOCUMENTS 63-168473 12/1981 Japan .

OTHER PUBLICATIONS

"Moire Considerations in Shadow-Mask Picture Tubes" by James P. Wittke, David Sarnoff Research Center, Princeton, N.J., SID 87 Digest, pp. 347-350.

Primary Examiner—Theodore M. Blum
Attorney, Agent, or Firm—Birch, Stewart, Kolasch & Birch

[57] ABSTRACT

A display device which comprise a color cathode ray tube including a finely perforated shadow mask having a multiple of minute apertures defined therein in a predetermined pattern in a vertical direction relates to scanning lines depicted by electron beams, a horizontal deflecting unit for causing the scanning lines to sweep in a horizontal direction, a vertical deflecting unit for displacing the scanning lines of the electron beams in a vertical direction to permit the scanning lines to assume equally spaced relationship with each other, and a scanning line position adjusting unit for displacing every other scanning line from the total number of the scanning lines in the vertical direction in a quantity required to minimize the appearance of Moire pattern.

11 Claims, 8 Drawing Sheets

$B_2 \cos \dfrac{4\pi Y}{P_B}$ (Component of Cycle $P_B/2$)

Fig. 8(a)    Fig. 8(b)

Component of Cycle $P_B/2$

DISPLAY DEVICE USING SHADOWMASK CRT

BACKGROUND OF THE INVENTION 1. (Field of the Invention)

The present invention generally relates to a display device utilizing a shadowmask color cathode ray tube and, more particularly, to a scanning device for driving electron beams in the shadowmask color cathode ray tube.

2. (Description of the Prior Art)

Figure 12:
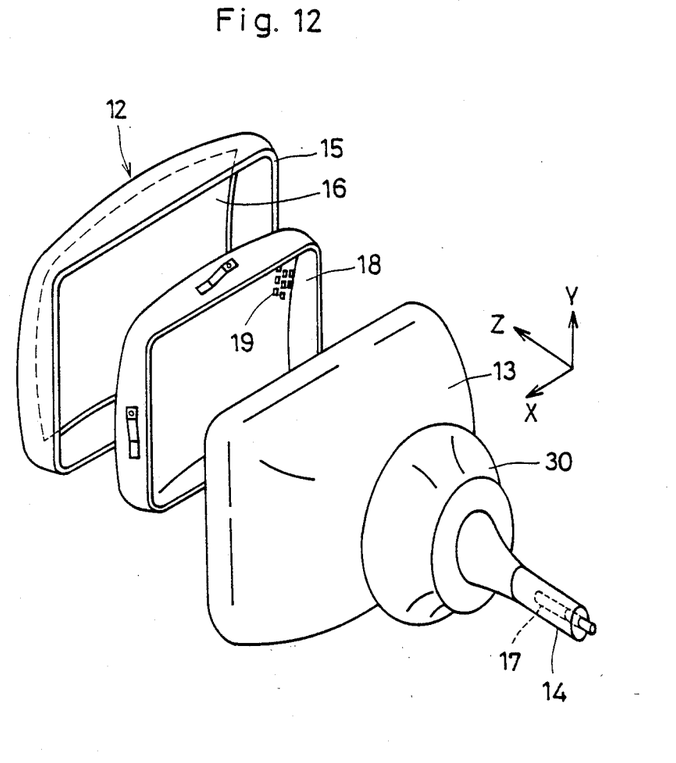
FIG. 12 is an exploded view of the conventional color cathode ray tube as viewed from rear.

As shown in FIG. 12, the conventional shadowmask color cathode ray tube utilizing a finely perforated shadow mask comprises a highly evacuated envelope 12 having a longitudinal axis Z and including a funnel section 13, a neck section 14 continued from one end of the funnel section 13 and a faceplate 15 sealed to the other end of the funnel section 13. The faceplate 15 has a phosphor deposited screen 16 having a predetermined pattern of triads of luminescent phosphor dots deposited thereon, and the neck section 14 accommodates therein an electron gun assembly 17 from which electron beams corresponding in color to the three primary colors, for example, red, green and blue, towards the phosphor deposited screen 16. The shadow mask 18 has a multiple of minute apertures or slots 19 defined therein in a predetermined regular pattern related systematically to the pattern of triads of the luminescent phosphor dots on the phosphor deposited screen 16 and allows the passages of the electron beams therethrough before the electron beams impinge upon the phosphor deposited screen 16. In FIG. 12, reference numeral 30 represents a deflection yoke mounted on the evacuated envelope 12, and reference characters X and y represent axes perpendicular to the longitudinal axis Z, while X-axis and Y-axis lie parallel to horizontal and vertical directions, respectively, on the phosphor deposited screen 16.

It has often been observed that, since the electron beams emitted from the electron gun assembly form substantially equally spaced scanning lines when sweeping across the phosphor deposited screen, shades delimited by the regularly patterned minute apertures or slots in the perforated shadow mask and the similarly regularly spaced scanning lines interfere with each other resulting in the appearance of undesirable Moire patterns on the screen of the color cathode ray tube.

A major cause of the appearance of the undesirable Moire patterns on the screen of the conventional display device utilizing the shadowmask color cathode ray tube will now be discussed in detail with particular reference to FIG. 5 of the accompanying drawing.

Figure 5A:
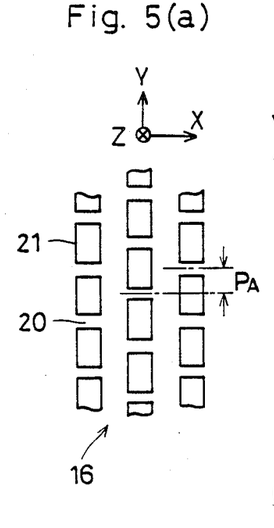
Figure 5B:
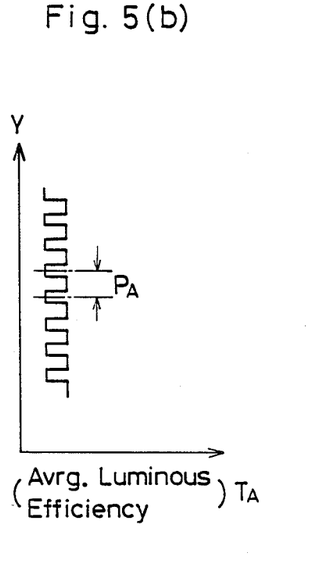

FIG. 5 (a) illustrates a portion of the phosphor deposited screen 16 showing a mosaic pattern of the luminescent phosphor dots in the conventional shadowmask color cathode ray tube of the type utilizing the finely slotted shadow mask 18 (FIG. 12) and FIG. 5 (b) illustrates a graph showing a change in average luminous efficiency relative to the mosaic pattern shown in FIG. 5 (a). The luminescent phosphor dots generally identified by 21 is of a substantially rectangular shape similar to the substantially rectangular shape of each minute aperture 19 in the perforated shadow mask 18 (FIG. 12) and are regularly distributed over the screen in a direction parallel to the Y-axis, each neighboring luminescent phosphor dots 21 being spaced apart from each other by the presence of a non-luminescent bridge portion 20.

The mosaic pattern of luminescent phosphor dots on the screen is composed of a multiple of equally spaced, parallel rows of the luminescent phosphor dots 21 each row extending parallel to the Y-axis, while the luminescent phosphor dots 21 of one row are offset relative to the luminescent phosphor dots 21 of the next adjacent row by half a pitch of the dots 21 in a direction parallel to the Y-axis.

Since the luminescent phosphor dots 21 of each row alternate with the non-luminescent bridge portions 20 of a corresponding row, the total radiation of light produced by the luminescent phosphor dots 21 of any two adjacent rows in a direction perpendicular to the Y-axis as a result of electron bombardment may be described in terms of an average luminous efficiency in the Y-axis direction. If the average luminous efficiency is expressed by TA (Y), the average luminous efficiency depicts such a curve as shown in FIG. 5 (b) and can be expressed by the following equation when transformed according to Fourier's series.

$$TA(Y) = A_0 + \sum_{m=1}^{\infty} A_m \cdot \cos(2\pi\, MY/PA) \quad (1)$$

wherein PA represents the cycle (pitch) of this function in the Y-axis direction and, as shown in FIG. 5 (a), is equal to half a pitch of the bridge portions 20 in one of the corresponding rows. This cycle PA can be referred to as an effective pitch of the average luminous efficiency and is therefore referred to as "effective pitch" hereinafter.

On the other hand, as is well known to those skilled in the art, the luminescent phosphor dots 21 when excited by electron beams emit light and are successively excited sequentially from left to right on the screen according to the sweeping motion of the electron beams in a direction substantially perpendicular to the Y-axis direction, leaving scanning lines that are equally spaced from each other over the phosphor deposited screen 16 to form a field, each field or two interlaced fields comprising one frame of television pictures that is reproduced on the screen of the color cathode ray tube.

Figure 6:
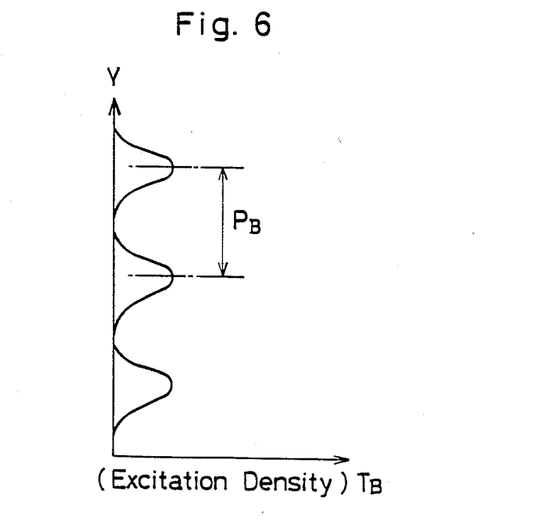
FIG. 6 is a diagram showing the pattern of distribution of excitation density in the Y-axis direction exhibited by the conventional color cathode ray tube.

The density of excitation by electron bombardment on the phosphor deposited screen (that is, the electron beam density) TB (Y) has a cyclic characteristic in the Y-axis direction as shown in FIG. 6 and can be expressed by the following equation when transformed according to Fourier's series.

$$(Y) = B_0 + \sum_{n=1}^{\infty} B_n \cdot \cos(2\pi\, nY/PB) \quad (2)$$

wherein PB represents the spacing between each neighboring scanning lines. In practice, the distribution L (Y) of luminance on the phosphor deposited screen in the Y-axis direction can be described as the product of the average luminous efficiency, expressed by the equation (1), multiplied by the excitation density expressed by the equation (2) and can therefore be expressed by the following equation.

$$L(Y) = \left[ A_0 \sum_{m=1}^{\infty} Am \cdot \cos(2\pi\, mY/PA) \right] \cdot \left[ B_0 + \sum_{n=1}^{\infty} Bn \cdot \cos(2\pi\, nY/PB) \right] \quad (3)$$

$$= A_0 B_0 + \Sigma\, B_0 Am \cdot \cos(2\pi\, mY/PA) + \Sigma\, A_0 Bn \cdot \cos(2\pi\, nY/PB) +$$

$$\Sigma \Sigma [AmBn \cdot \cos(2\pi\, mY/PA) \cdot \cos(2\pi\, nY/PB)]$$

In equation (3), the second term represents the mosaic pattern of the luminous phosphor dots and the third term in the same equation (3) represents the pattern of components of the scanning lines. Also, the fourth term in the equation (3) can be rewritten as follows.

$$\Sigma \Sigma [AmBn \cdot \cos(2\pi\, mY/PA) \cdot \cos(2\pi\, nY/PB)] = \quad (4)$$

$$\Sigma \Sigma (AmBn/2) \cdot [\cos 2\pi\, Y(m/PA + n/PB) +$$

$$\cos 2\pi\, Y(m/PA - n/PB)]$$

While the first term in the equation (4) can be negligible because of the cyclic function smaller in pitch than any one of the mosaic pattern of the luminescent phosphor dots and the pattern of the scanning lines, the second term in the same equation (4) is the cyclic function which may give a very large spatial cycle (pitch) and would result in a noticeable pattern of large fringes which is objectionable to look at. This pattern of large fringes is referred to as Moire pattern and, therefore, the second term in the equation (4) is referred to as Moire term. When this Moire term is taken out, it can be expressed as follows.

$$\Sigma\Sigma(AmBn/2)\cdot\cos 2\pi\, Y(m/PA - n/PB)$$
$$= \Sigma\Sigma(AmBn/2)\cdot\cos 2\pi\, Y[1/\{PAPB/(mPB - nPA)\}]$$

That is to say, the amplitude of change in intensity of light is expressed by (AmBn/2) and the pitch is expressed by [PAPB/(mPB−nPA)]. This pattern varies depending on respective specific values for m and n and, when (m, n) is fixed, one of them can be fixed. Moire pattern corresponding to a certain combination of m and n is referred to as Moire pattern in a mode (m, n).

One of the conditions in which Moire pattern becomes conspicuous on the screen of the color cathode ray tube occurs when this pitch becomes large or the value (mPB−nPA) takes a small value. In other words, it must satisfy the condition in which mPB becomes substantially equal to nPA.

On the other hand, it is usual that the respective values of Am and Bn are greater for m and n each being within the range of 1 to 3 than for m and n each being the value of 4 or greater.

Accordingly, generally in the color cathode ray tube, considerations have been paid that, for a given spacing PB between each neighboring scanning lines, the value of PA, that is, the spacing in the Y-axis direction of the phosphor deposited screen, and the corresponding pitch between each neighboring apertures in the shadow mask are so selected as to prevent one of mPB and nPA from becoming equal to the other of mPB and nPA with respect to the particular values (1 to 3) of m and n, so that Moire pattern in any mode will not exhibit an increased pitch (spatial cycle).

However, when it comes to the color cathode ray tube for use as computer output devices, that is, display devices wherein the number of scanning lines varies from one make to another, the spacing PB between each neighboring scanning lines can not be considered generally fixed. In such display devices, in order to minimize the appearance of Moire pattern in any mode of combinations of m and n, each being within the range of 1 to 3, for any expected number of scanning lines, that is, for any spacing between each neighboring scanning lines, the pitch PA between each neighboring aperture in the shadow mask must be adjusted. If the pitch PA is chosen to be small, the result would be that the screen becomes dark. On the other hand, if the pitch PA is chosen to be great, the mosaic pattern becomes coarse (with the consequent that the second term of the equation (3) become a problem) to such an extent as to result in the deteriorated screen and also a difficulty in maintaining a sufficient strength of the shadow mask.

In an attempt to minimize the appearance of Moire pattern, Japanese Laid-open Patent Publication No. 56-168473, published Dec. 24, 1981, discloses a technique wherein the overlapping between the interlaced first and second fields forming one frame of the television picture is slightly displaced from the position where they ought to have overlapped with each other. It has however been found that the technique disclosed in the above mentioned Japanese publication cannot be applicable to color cathode ray tubes other than the type operable with the interlaced scanning system.

The paper written by J. P. Wittke and entitled "Moire Considerations in Shadow-Mask Picture Tubes", published in SID 87 DIGEST, p. 347-350, May 1987, describes a technique of changing the vertical pitch, that is, the spacing between each neighboring slot-shaped apertures in the shadow mask, for minimizing the appearance of Moire pattern. According to this paper, it is obvious that the production of a number of shadow masks each having a different vertical pitch in the pattern of the apertures of the shadow mask are required for the system which operates on a different number of scanning lines.

SUMMARY OF THE INVENTION

Accordingly, the present invention has been devised with a view to providing a display device utilizing the shadowmask color cathode ray tube suited for use with the system wherein one field comprise one frame and which can operate on a different number of scanning lines without substantially being accompanied by the appearance of noticeable Moire pattern.

In order to accomplish this object of the present invention, there is provided a display device which comprises a color cathode ray tube including a finely perforated shadow mask having a multiple of minute apertures defined therein in a predetermined pattern in a vertical direction relative to scanning lines depicted by electron beams, a horizontal deflecting means for causing the scanning lines to sweep in a horizontal direction, a vertical deflecting means for displacing the scanning lines of the electron beams in a vertical direction to permit the scanning lines to assume equally spaced relationship with each other, and a scanning line position adjusting means for displacing every other scanning line from the total number of the scanning lines in the vertical direction in a quantity required to minimize the appearance of Moire pattern.

In particular, the present invention is featured in that, separately from the use of the vertical deflecting means generally used in association with the color cathode ray tube, means is provided for displacing every other scanning line from the total number of the scanning lines, depicted by electron beam spots on the phosphor deposited screen, in a quantity required to suppress Moire pattern.

According to the present invention, when every other scanning line from the total scanning lines each depicted by electron beam spots on the phosphor deposited screen of the color cathode ray tube is displaced in the vertical direction, the cycle of vertical arrangement of the luminescent phosphor dots which are excited by the bombardment of the electron beams can be varied and, therefore, the appearance of Moire pattern related with the cycle of vertical arrangement of the apertures in the shadow mask can be advantageously minimized.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

FIG. 5 (a) illustrates a portion of the phosphor deposited screen showing a mosaic pattern of the luminescent phosphor dots in the conventional shadowmask color cathode ray tube of the type utilizing the finely slotted shadow mask;

FIG. 5 (b) illustrates a graph showing a change in average luminous efficiency relative to the mosaic pattern shown in FIG. 5 (a);

FIGS. 11 (a) and 11 (b) illustrate different patterns of luminescent phosphor dots on the phosphor deposited screens, respectively.

DETAILED DESCRIPTION OF THE EMBODIMENTS

Figure 1:
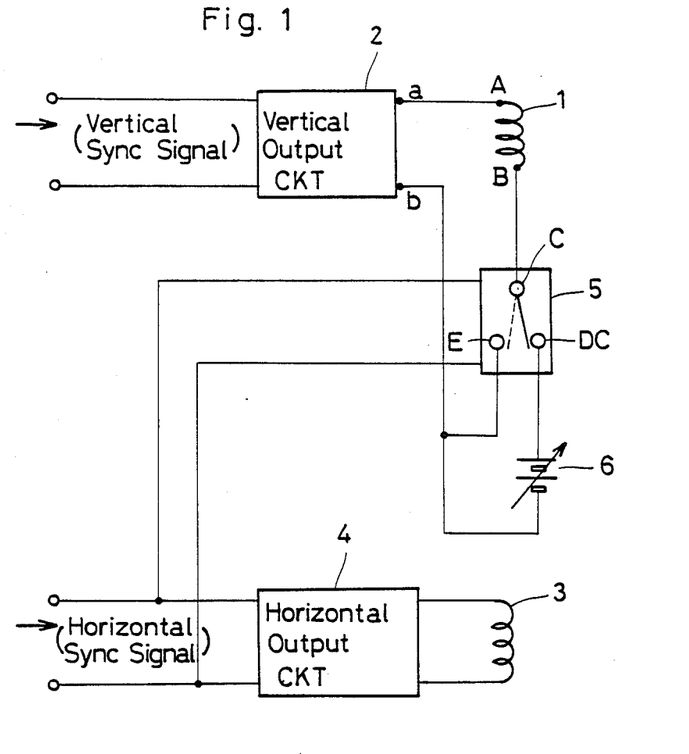
FIG. 1 is a block circuit diagram showing an essential portion of a first preferred embodiment of the present invention.

Referring first to FIG. 1, there is shown a deflection system for a shadowmask color cathode ray tube as shown in FIG. 12, which system comprises a vertical deflection coil 1 connected with a vertical output circuit 2 from which a vertical deflection current is supplied to the vertical deflection coil 1, and a horizontal deflection coil 3 connected with a horizontal output circuit 4 from which a horizontal deflection current is supplied to the horizontal deflection coil 3. Vertical and horizontal synchronizing signals are respectively applied to the vertical and horizontal output circuits 2 and 4 so that the vertical and horizontal deflection currents synchronized respectively with the vertical and horizontal synchronizing signals can be supplied to the associated deflection coils 1 and 3.

The vertical output circuit 2 has an output terminal a connected directly with one end A of the vertical deflection coil 1 and also has an output terminal b connected directly with one of selection terminals, that is, a selection terminal E, of a flip-flop switch 5 forming a switching means and also with the selection terminal DC of the same flip-flop switch 5 through a direct current power source 6. A common terminal C of the flip-flop switch 5 is connected with the other end B of the vertical deflection coil 1.

The flip-flop switch 5 is in the form of an electronic switch whose operation is controlled by ON and OFF states of an electronic circuit contained therein. In the illustrated embodiment, the flip-flop switch 5 operates in such a manner that the common terminal C can be electronically selectively connected with one of the selection terminals E and DC each time a horizontal synchronizing pulse, which is also supplied to the horizontal output circuit 4, is applied to the flip-flop switch 5.

The direct current power source 6 is an adjustable power supply from which a predetermined low current is supplied to the vertical deflection coil 1 for the purpose which will be described later, the value of said predetermined low current being adjustable.

Figure 2:
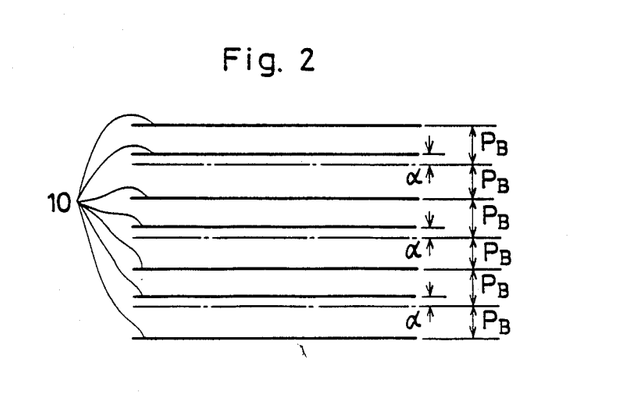
FIG. 2 is a schematic diagram showing horizontal scanning lines which are equally spaced from each other on the phosphor deposited screen of a color cathode ray tube according to the first preferred embodiment of the present invention.

FIG. 2 illustrates horizontal scanning lines 10 which are depicted by electron beams sweeping across the phosphor deposited screen of the color cathode ray tube. As shown by phantom lines in FIG. 2, every other scanning line from the total number of scanning lines 10 is displaced in the Y-axis direction (i.e., the vertical direction) by a predetermined amount of displacement $\alpha$ from the position at which they assumes an equally spaced relationship with each other. The flip-flop switch 5 referred to above is employed for the purpose of displacing every other scanning line 10 in the manner described above, and the adjustable DC power source 6 is employed for the adjustment of the displacement $\alpha$. In other words, the adjustable DC power source 6 constitutes a part of a scanning line position adjusting means.

Hereinafter, the reason why Moire pattern generated during the mode (m, n) can be eliminated when the displacement α relative to the value of n is properly selected will be discussed.

The reason that Moire pattern during the mode (m, n) poses a problem when the scanning lines sweep in equally spaced relationship to each other is because, as can be understood from the discussion made with reference to the equations (1) to (4), the m-order higher harmonic component of the average luminous efficiency TA (Y), which is a function of the cycle of Y having a fundamental cycle PA, and the n-order higher harmonic component of the excitation density (beam density) TB (Y) having a fundamental cycle PB interfere with each other to produce a pattern of low and high light components such as shown by the equation (5). The reason that every other scanning line is displaced by the predetermined displacement α such as in the illustrated embodiment is for the purpose of substantially diminishing the latter, that is, Bn, to substantially eliminate the appearance of Moire pattern during the mode (m, n).

Figure 7:
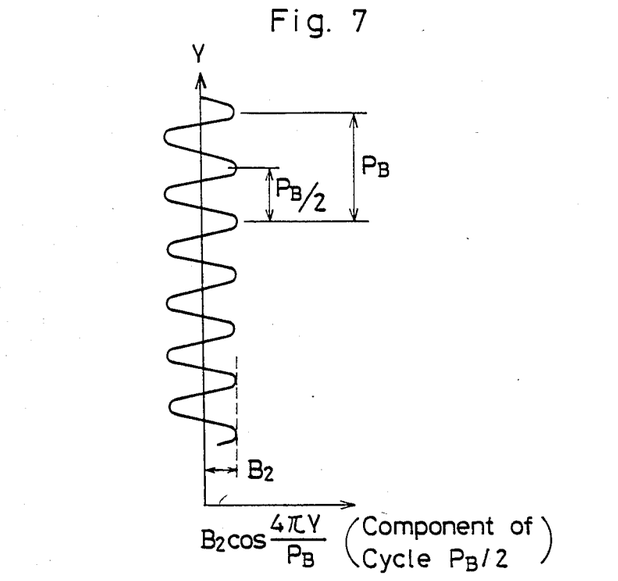
FIG. 7 is a diagram showing high frequency components contained in the distribution pattern of excitation density shown in FIG. 6.

This will now be illustrated by the example wherein n is equal to 2. That B2 is not zero means that, when the excitation density TB (Y) shown in FIG. 6 is transformed according to Fourier's series as shown by the equation (2), a component of a cosine wave is included therein as a higher harmonic component which results in the cycle of PB/2 and amplitude of ±B2 such as shown in FIG. 7.

Figure 8A:
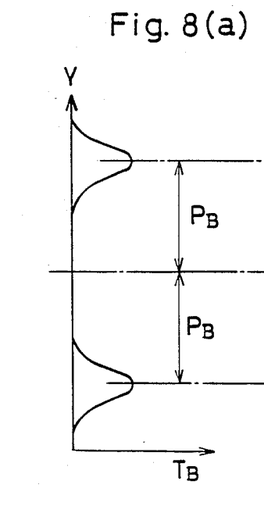
FIGS. 8a and 8b are diagrams showing the distribution pattern of excitation density exhibited when every other scanning line from the total scanning lines shown in FIG. 6 is sampled out, and high frequency components thereof.
Figure 8B:
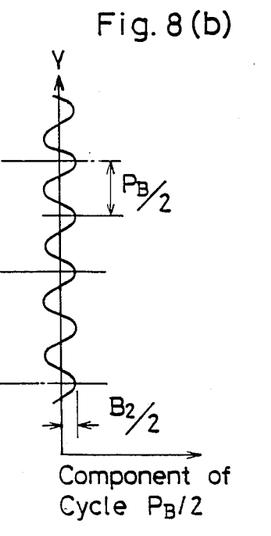

Considering the high harmonic component of the cycle PB/2 included in every other scanning line taken out from the whole scanning lines which are spaced at the intervals of PB, the amplitude thereof ought to have been ±B2/2 as shown in FIG. 8. This is because, the intrinsic arrangement of the scanning lines shown in FIG. 6 corresponds to two sets of the arrangement of the odd-numbered or even-numbered scanning lines, shown in FIG. 8, which are overlapped with each other while having been displaced in the Y-axis direction by an amount corresponding to PB and, at this time, the cosine wave which is the higher harmonic component of the cycle PB/2 are matched in phase enough to overlap with each other to give the cosine wave of ±B2 in amplitude as shown in FIG. 7.

Figure 3:
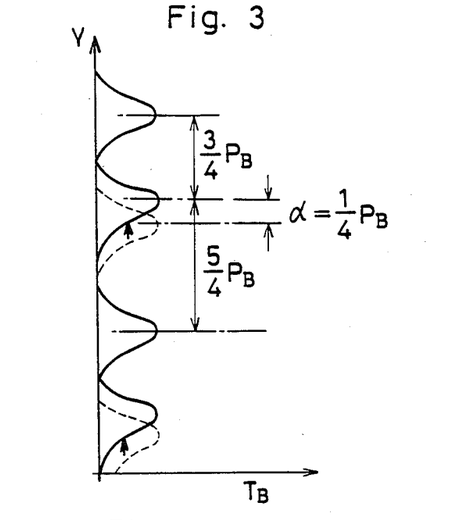
FIG. 3 is a diagram showing a pattern of distribution of excitation density exhibited by the color cathode ray tube wherein the scanning lines are spaced as shown in FIG. 2.

In view of the foregoing, if two sets of the arrangement of the odd-numbered or even-numbered scanning lines shown in FIG. 8 are overlapped with each other while having been displaced $\alpha = \frac{1}{4} \times PB$ as shown in FIG. 3 from the position where they are displaced PB that is, the conventional position shown in FIG. 6, the higher harmonic component of PB/2 in cycle discussed hereinabove can be just counterbalanced to zero. Accordingly, Moire pattern related to B2, that is, Moire pattern during the mode (m, 2), can disappear. When overlapping this way, the direction in which they are to be displaced may be either a positive direction or a negative direction parallel to the Y-axis and, therefore, each of them will not be discussed here for the sake of brevity. By a similar reasoning, a similar effect can be appreciated even when $\alpha = \frac{3}{4} \times PB$. However, increase of the displacement α results in departure of the scanning lines from the equally spaced relationship thereof to such an extent that a high-fidelity image reproduction may be impaired, and therefore, the selection of a small value for the displacement α from a possible range is preferred.

While the example wherein n=2 has been described, n may take a value other than 2 by a similar reasoning. For example, $$n = 1; \alpha = \frac{1}{2} \times PB$$

$$n = 2; \alpha = \frac{1}{4} \times PB$$

$$n = 3; \alpha = 1/6 \times PB$$

Therefore, it will readily be understood that, for a given n, the displacement α can be expressed by $\frac{1}{2}n \times PB$.

The DC voltage generated by the direct current power source 6 shown in FIG. 1 is determined in consideration of the foregoing discussion. More specifically, the DC voltage generated by the direct current power source 6 may be fixed by a manufacturer of the color cathode ray tubes according to a design specification in which a particular value is chosen for n by monitoring the appearance of Moire pattern and adjusting the DC voltage so that every other scanning line from the whole scanning lines can be displaced by the displacement α determined by the general equation of $\alpha = \frac{1}{2}n \times PB$. Alternatively, the user of the display device utilizing the color cathode ray tube can adjust the output voltage of the power source 6 in an attempt to minimize the appearance of Moire pattern while allowing the scanning lines to maintain possibly the equally spaced relationship with each other.

It is to be noted that the displacement α for the given value of n may not be strictly equal to that given by the general equation referred to above. Particularly, as the previous discussion has made it clear, the selection of the displacement α to be either zero or $\frac{1}{2} \times PB$ when n=2 results in the most undesirable condition in respect of Moire pattern and the selection of the displacement α to be $\frac{1}{4} \times PB$ when n=2 results in the most desirable condition in respect of Moire pattern. Accordingly, the selection of the displacement α to be of a value intermediate between the specific displacements can result in a condition intermediate between those most undesirable and desirable conditions. In view of this, a comprise between the high fidelity reproduction of the image and the minimization of the appearance of Moire pattern can be determined through the actual use of the display device utilizing the color cathode ray tube. This description can apply where n is chosen to be a value other than that discussed above.

Figure 4:
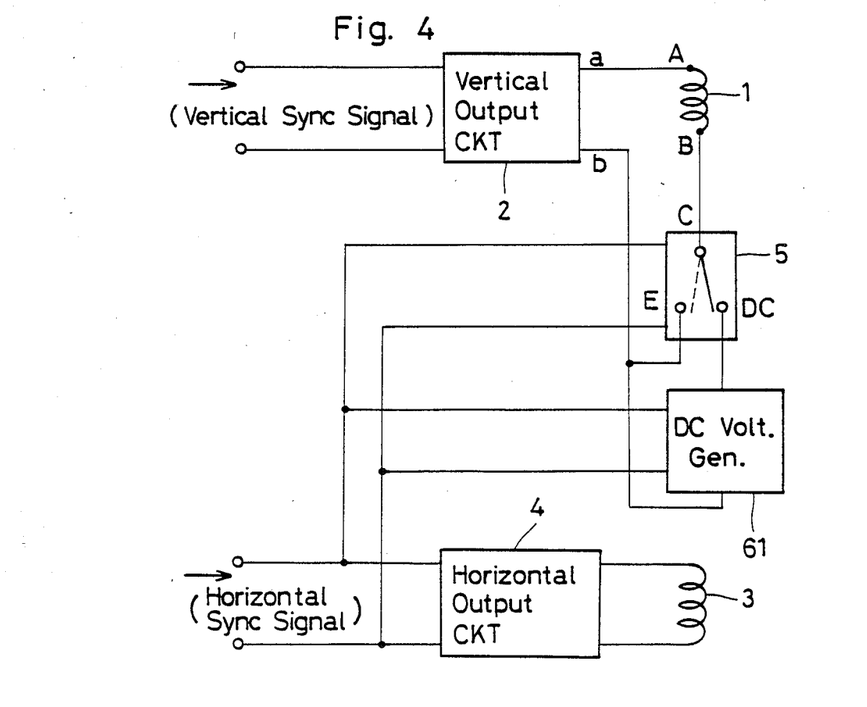
FIG. 4 is a block circuit diagram showing an essential portion of a second preferred embodiment of the present invention.

FIG. 4 illustrates the deflection system according to a second preferred embodiment of the present invention. In this embodiment of FIG. 4, instead of the use of the adjustable direct current power source 6 employed in the foregoing embodiment, a direct current voltage generator 61 capable of automatically coordinating the setting of an output voltage with the pulse interval of the horizontal synchronizing signal.

As is well known to those skilled in the art, the number of scanning lines in the output display device used in connection with the computer varies from one system to another and, therefore, the manner in which Moire pattern is produced varies correspondingly. In general, however, the size of the raster formed by the scanning lines is substantially fixed and the number of images reproduced per second is substantially fixed to 60 images in view of the persistency of human eyes. Accordingly, it is substantially possible to detect the spacing PB between each neighboring scanning lines from the pulse interval of the horizontal synchronizing signal and, therefore, if an appropriate calculating device is incorporated in the direct current voltage generator 61, a displacement voltage appropriate to the spacing PB between each neighboring scanning lines, that is, the displacement $\alpha$ can be automatically determined so as to provide the display device in which the appearance of Moire pattern can be minimized under any condition. It is, however, to be noted that arrangement may be made to supply the vertical synchronizing signal to the direct current voltage generator 61, in addition to the horizontal synchronizing signal, so that the spacing between each neighboring scanning lines can be more accurately calculated.

In a standard display device of scanning type, a vertical flyback period is provided to permit a repetition of one raster to another by allowing electron beam spots to flyback from bottom to top of the screen. Although the flyback motion of the electron beam spot during the flyback period is not visible to human eyes, the scanning in the horizontal direction continues even during the flyback period. The total number, per raster, of the scanning lines including those not visible to the human eyes includes those which are even-numbered and those which are odd-numbered. Although no problem arise as far as the even-numbered scanning lines are concerned, the odd-numbered scanning lines bring about a problem in that, when the flip-flop switch 5 undergoes a switching operation for each scanning line, the scanning lines for one raster and those for the next succeeding raster will not match with each other, resulting in an objectionable image reproduction accompanied by undesirable flickering. In such case, it is necessary either to supply an extra pulse to the flip-flop switch 5 to trigger the latter during the flyback period or to reduce by one the number of pulses of the synchronizing pulse to be supplied to the flip-flop switch 5 thereby to reduce the number of switching operations by one. The system shown in FIG. 4 can be advantageous in that such procedure can be easily accomplished automatically.

In any one of the preferred embodiments of FIGS. 1 and 4, respectively, the flip-flop switch 5 and the direct current power source 6 or the direct current voltage generator 61 have been shown and described as constructed separately from each other. However, in accordance with the broad aspect of the present invention, those skilled in the art can devise a circuit in which the flip-flop switch 5 and the direct current power source 6 or the direct current voltage generator 61 may be integrated together. Also, it is to be noted that one of the direct current voltages applied to the terminal B of the vertical deflection coil 1 by the switching operation of the flip-flop switch 5 may not be always limited to zero volt, but may be be of such a value that the difference between those direct current voltages can result in the predetermined displacement $\alpha$.

Also, means for displacing the scanning lines from the initial position at which they assume the equally spaced relationship may comprise a magnetic field generator for generating a magnetic field separately from that produced by a deflection yoke and without relying on the control of the vertical deflection current flowing through the deflection yoke 30 in FIG. 12, which magnetic field generator is to be disposed at a predetermined position on the color cathode ray tube, for example, either frontwardly or rearwardly of the deflection yoke 30 with respect to the longitudinal axis Z of the evacuated tube 12. An example of the deflection system in which the magnetic field generator is employed in accordance with the present invention is illustrated in FIG. 9.

Figure 9:
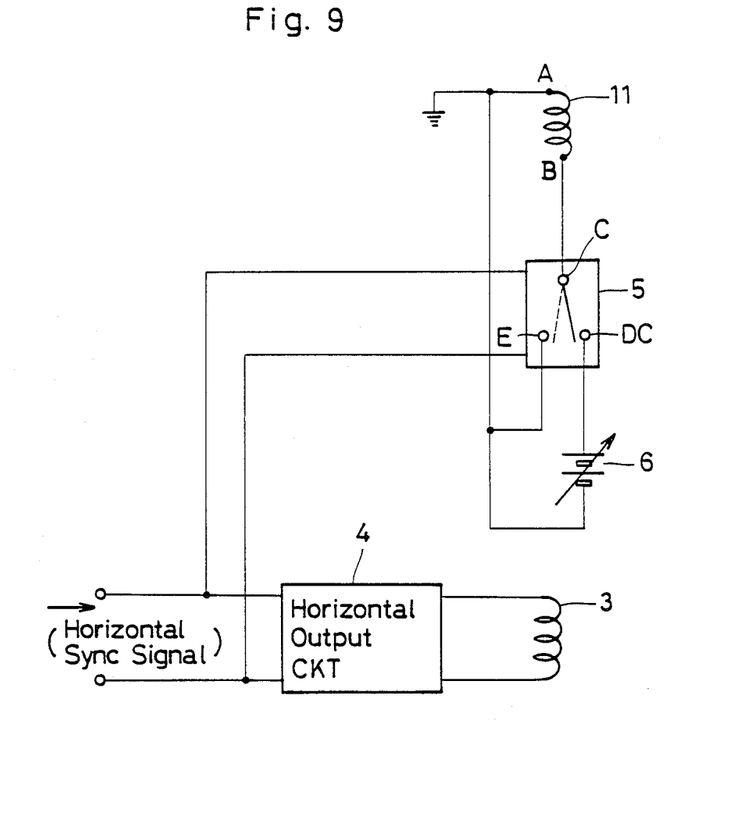
FIG. 9 is a block circuit diagram showing an essential portion of a third preferred embodiment of the present invention.

Referring to FIG. 9, the magnetic field generator shown therein comprises a specially designed magnetic field forming coil 11 for accomplishing the displacement $\alpha$ to which the output from the direct current power source 6 is supplied through the flip-flop switch 5.

Figure 10:
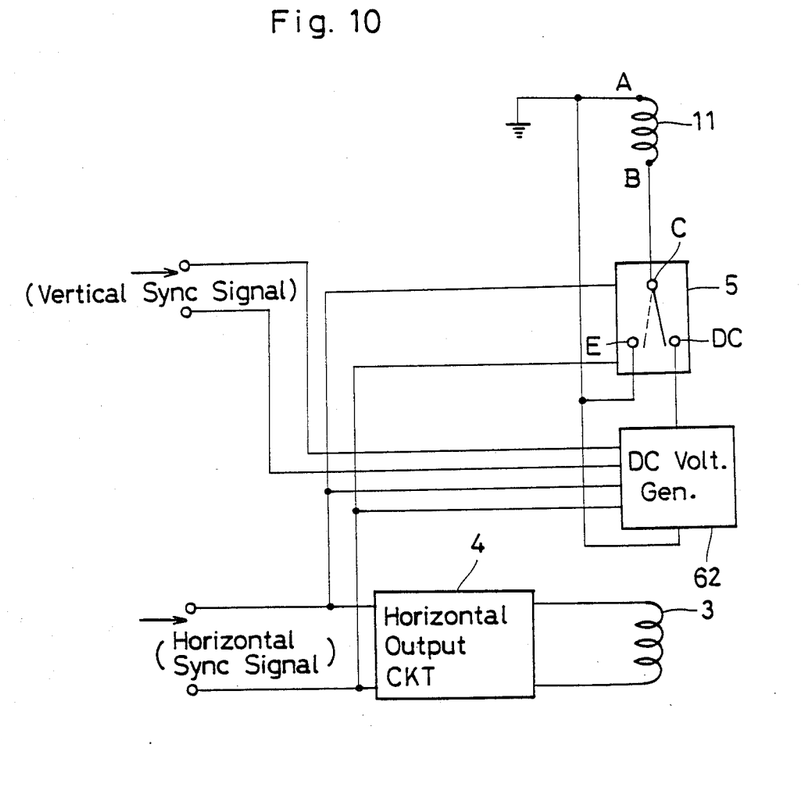
FIG. 10 is a block circuit diagram showing an essential portion of a fourth preferred embodiment of the present invention.

Instead of the use of the direct current power source 6 in the embodiment of FIG. 9, a direct current voltage generator 62 capable of automatically setting the displacement $\alpha$ in dependence on the spacing PB between each neighboring scanning lines may be used in the system of FIG. 9 such as shown in FIG. 10. The direct current voltage generator 62 shown in FIG. 10 is so designed as to receive both of the horizontal and vertical synchronizing signals to calculate accurately the spacing PB between each neighboring scanning line. However, as is the case with the direct current voltage generator 61 used in the embodiment shown in and described with reference to FIG. 4, the direct current voltage generator 62 in the embodiment of FIG. 10 may be so designed as to receive only the horizontal synchronizing signal for the automatic setting of the displacement $\alpha$.

Other than those shown in and described with reference to the accompanying drawings, any other circuit construction may be employed for accomplishing the displacement of every other scanning line by a predetermined amount $\alpha$.

From the foregoing description of the present invention, it has now become clear that, since every other scanning line from the total number of the scanning lines, depicted by electron beam spots on the phosphor deposited screen, is displaced in a quantity required to suppress Moire pattern, the present invention is effective to provide the display device in which the appearance of Moire pattern is advantageously minimized even where one field constitutes one frame.

Although the present invention has fully been described in connection with the preferred embodiments thereof with reference to the accompanying drawings used only for the purpose of illustration, those skilled in the art will readily conceive numerous changes and modifications within the framework of obviousness upon the reading of the specification herein presented of the present invention. By way of example, although reference has been made to the deflection system for use with the color cathode ray tube of the type employing the perforated shadow mask 18 having the slotted apertures 19 in FIG. 12 corresponding to the rectangular luminescent phosphor dots 21 shown in FIG. 5, the deflection system according to the present invention can equally operate satisfactorily with the color cathode ray tube employing the perforated shadow mask having the apertures of any other shape.

Figure 11A:
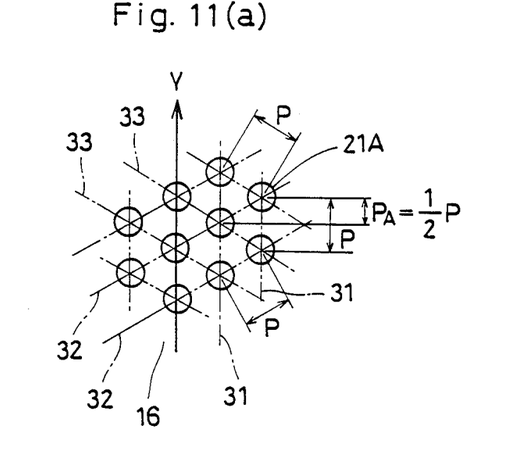
Figure 11B:
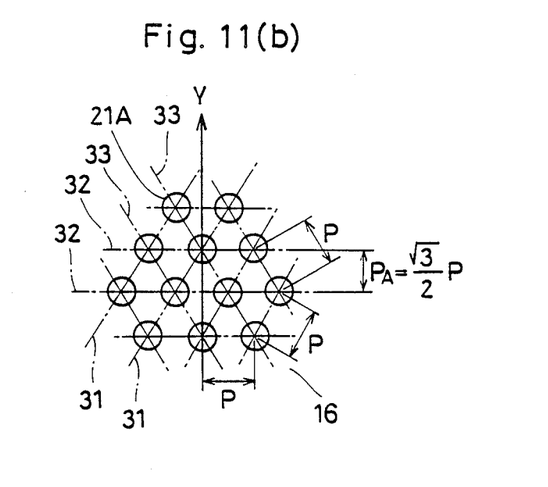

More specifically, the perforated shadow mask in the color cathode ray tube utilizable in association with the deflection system of the present invention may be of a type wherein circular apertures patterned in triads which are equally spaced at an angle of 60° from each other. In such case, the mosaic pattern of triads of luminescent phosphor dots on the phosphor deposited screen of the color cathode ray tube may be available in two types shown in FIGS. 11 (a) and 11 (b), in correspondence with the respective patterns of the triads of circular aperture. FIGS. 11 (a) and 11 (b) show the mosaic pattern of the luminescent phosphor dots 21A of the same color which are arranged on points of intersection of three sets of linear lines 31, 32 and 33, each set comprising a group of equally spaced parallel lines and intersecting with the other two sets at an angle of 60°. The effective pitch PA employed as one of the parameters in the equation (1) for the determination of the possible appearance of Moire pattern corresponds to half the spacing P between the luminescent phosphor dots 21A of the same color in the neighboring triads as indicated in FIG. 11 (a) where the perforated shadow mask having the circular apertures patterned correspondingly is employed, or corresponds to $\sqrt{3/2}$ of the spacing P as indicated in FIG. 11 (b) where the perforated shadow mask having the circular aperture patterned correspondingly is employed.

Accordingly, such changes and modifications are, unless they depart from the spirit and scope of the present invention as delivered from the claims annexed hereto, to be construed as included therein.

What is claimed is:

1. A display device which comprises:
   a color cathode ray tube including a finely perforated shadow mask having a multiple of minute apertures defined therein in a predetermined pattern in a vertical direction relative to scanning lines depicted by electron beams;
   a horizontal deflecting means for causing the scanning lines to sweep in a horizontal direction;
   a vertical deflecting means for displacing the scanning lines of the electron beams in a vertical direction to permit the scanning lines to assume equally spaced relationship with each other; and
   a scanning line position adjusting means for displacing every other scanning line from the total number of the scanning lines in the vertical direction in a quantity required to minimize the appearance of Moire pattern.

2. The display device as claimed in claim 1, wherein the scanning line position adjusting means comprises a vertical magnetic field generating unit and a variable direct current power source for supplying to the vertical magnetic field generating unit a voltage necessitated to displace every other scanning line from the total number of the scanning lines in the vertical direction.

3. The display device as claimed in claim 1, wherein the scanning line position adjusting means comprises a vertical magnetic field generating unit and a variable direct current generator operable in response to at least one of horizontal and vertical synchronizing signals to calculate the spacing between each neighboring horizontal scanning lines and also to supply to the vertical magnetic field generating unit a direct current voltage for giving a displacement in the vertical direction in an amount corresponding to the spacing of the neighboring horizontal scanning lines so calculated.

4. The display device as claimed in claim 2, wherein said vertical magnetic field generating unit comprises a vertical deflection coil included in the vertical deflecting means.

5. The display device as claimed in claim 2, wherein said vertical magnetic field generating unit comprises a magnetic field generating coil mounted on the color cathode ray tube in the vicinity of a deflection yoke.

6. The display device as claimed in claim 3, wherein said vertical magnetic field generating unit comprises a vertical deflection coil included in the vertical deflecting means.

7. The display device as claimed in claim 3, wherein said vertical magnetic field generating unit comprises a magnetic field generating coil mounted on the color cathode ray tube in the vicinity of a deflection yoke.

8. The display device as claimed in claim 2, wherein said scanning line position adjusting means includes a switching means operable in response to the horizontal synchronizing signal to supply a direct current voltage to the vertical deflection magnetic field generating unit from the variable direct current power source with respect to every other scanning line from the total number of the scanning lines.

9. The display device as claimed in claim 3, wherein said scanning line position adjusting means includes a switching means operable in response to the horizontal synchronizing signal to supply a direct current voltage to the vertical deflection magnetic field generating unit from the variable direct current generator with respect to every other scanning line from the total number of the scanning lines.

10. The display device as claimed in claim 1, wherein said scanning line position adjusting means is operable to displace every other scanning line from the total number of the scanning lines in a quantity equal to $\frac{1}{2}n$ of the spacing between each neighboring scanning lines, while said n is a integer.

11. The display device as claimed in claim 10, wherein said scanning line position adjusting means is operable to displace every other scanning line from the total number of the scanning lines in a quantity equal to one fourth of the spacing between each neighboring scanning lines.

* * * * *